United States Patent

[11] 3,561,320

| [72] | Inventors | Jerome W. Nelson;<br>Eugene F. Sims, Houston, Tex. |
|---|---|---|
| [21] | Appl. No. | 726,358 |
| [22] | Filed | May 3, 1968 |
| [45] | Patented | Feb. 9, 1971 |
| [73] | Assignee | CRC-Crose International, Inc.<br>a corporation of Oklahoma |

[54] METHOD AND MEANS FOR ALIGNING TUBE CLAMPING MECHANISMS AND THE LIKE
16 Claims, 7 Drawing Figs.

[52] U.S. Cl.................................................. 29/493,
29/272; 228/4, 228/29, 228/44, 228/49; 269/48.1
[51] Int. Cl.................................................... B23k 5/22
[50] Field of Search.......................................... 228/4, 29,
44, 49; 269/48.1; 29/272, 493

[56] References Cited
UNITED STATES PATENTS

| 3,115,859 | 12/1963 | Haussler et al. | 269/48.1 |
| 3,197,195 | 7/1965 | Work et al. | 269/48.1X |
| 3,259,964 | 7/1966 | Engel | 228/49X |
| 3,266,700 | 8/1966 | Bauer et al. | 228/49X |
| 3,362,603 | 1/1968 | Bauer et al. | 269/48.1X |
| 3,445,104 | 5/1969 | Douglas | 269/48.1 |
| 3,461,264 | 8/1969 | Nelson et al. | 228/44X |

Primary Examiner—John F. Campbell
Assistant Examiner—Ronald J. Shore
Attorney—Edwin M. Thomas ABSTRACT: Tubular members which are to be brought together end to end are centered and aligned by first centering a clamping mechanism in one of them, next aligning the clamping mechanism with respect to the plane of the end of the tubular member, actuating the clamping mechanism, then bringing another tubular member into position and clamping it there. The invention includes a centering mechanism, aligning mechanism, positive operating means for both mechanisms, as well as clamping means. The clamping and aligning structure is equipped with propulsion means and a limited movement yieldable joint is provided between the propulsion means and the other mechanism. This permits proper alignment and centering of the whole apparatus with respect to the tubes and also with respect to the plane of their end juncture.

PATENTED FEB 9 1971

INVENTORS
JEROME W. NELSON
EUGENE F. SIMS

BY
*Edwin M. Thomas* ATTORNEY

PATENTED FEB 9 1971 3,561,320

METHOD AND MEANS FOR ALIGNING TUBE CLAMPING MECHANISMS AND THE LIKE

BACKGROUND AND PRIOR ART

Although several systems have been proposed for bringing together and holding large tubular members, such as joints of long diameter pipe, in end abutting relationship, e.g. for welding, difficulties have usually been encountered in holding or aligning them with the high precision that is desirable. For example, during sound welding butt joints of large diameter pipelines it is obvious that the abutting ends must be held firmly and in good alignment all around their periphery.

While the above is true in a degree when the joints are to be welded manually, accurate alignment is even more imperative when the joint is to be welded mechanically, by automatic or semiautomatic means. In a large tube or pipe, one of 42 inches diameter, for example, a very slight angular misalignment of the welding mechanism, even as little as a few seconds of arc between the plane of the welding operation and the plane of the end joint obviously will result in failure. Also, any lateral or longitudinal misalignment of the welding mechanism, with respect to the joint or any part of it, will result in failure. Displacement of even a few thousands of an inch is very objectionable; larger displacements cannot be tolerated.

Various suggestions have been made in the past for securing the desired alignment by mechanical means. In general, these have been lacking either in accuracy of positioning or in adequacy of power to perform their functions. In some cases attention has been given to longitudinal alignment without adequate regard for centering of the equipment which of course is essential.

It has also been suggested and disclosed in an application, Ser. No. 608,872, filed Jan. 12, 1967 by one of the present inventors, that a combination of internal clamping means and an orbitally movable welding unit, all mounted inside the pipe or tubing, can be used to form at least a first pass or "stringer bead" weld, particularly in large diameter pipe lines where it is of very considerable economic advantage to be able to form the girth welds automatically or mechanically. Here again, the problem of locating and holding or guiding the welding mechanism with sufficient accuracy is an acute one.

The present invention is particularly designed to meet the above described needs. It is especially intended for centering and aligning a combination internal clamping and internal automatic welding apparatus for use in joining the ends of large diameter tubing. It is not limited to such use, however. It is applicable to centering, holding and/or aligning various tubular or cylindrical elements for various purposes, such as end-finishing, attachment of other members of various shapes and functions, etc. While particularly designed for internal expanding clamps, the invention is not limited thereto.

Hence one object of the present invention is to center a holding or clamping mechanism with respect to a tubular member. Another object is to force oval or otherwise warped tubular members to a truer circular configuration. Large pipes and other tubes often get out of round, due to external or internal forces and the apparatus of the present invention can be used to correct this condition. Still another object is to align a clamping or holding mechanism in a proper orientation with respect to a plane end surface of a pipe or other tube, whether for welding or for some other purpose.

Assuming that the end of a pipe or tube lies in a true plane, usually perpendicular to its axis, any three points on the end surface will define that plane. By contacting these three points with accurately surfaced feelers and locating the clamp and other mechanism precisely with respect to the feelers, the proper parallel alignment may be obtained. To do so is still another object of this invention.

The clamping mechanism for a large diameter pipe line is necessarily a rather heavy piece of mechanism. It becomes heavier when welding mechanism is associated with or built into it, as suggested above. For this reason it is often desirable to provide such mechanism not only with wheels or rollers to facilitate its movement through the pipe but also with self-contained or associated mechanical propulsion means. These means may comprise traction gearing operated by a suitable motor driven electrically or by compressed air, etc. Such may be incorporated into a tandem traction unit to push or pull the clamp through the pipe. The driving unit, if so attached, normally will be articulated to the clamp structure to facilitate passage of the whole assembly through curved sections of the pipe. In such a case, the articulated joint permits flexure. Such flexure, or the means which provide it, may tend to cause misalignment or to interfere with proper alignment of the clamp with respect to the tubing end. Another object of the present invention, therefore, is to provide a stiff resilient control over the articulation thereby to facilitate proper alignment of the mechanism with respect to the plane of a tube end or end surface.

While the invention contemplates particularly the joining end to end of two tubular sections, such as lengths of steel pipe in a pipeline, it will be understood that the method and the apparatus in their broader aspects, may be used for other operations on pipe or other tubing. For example, it may be desired to clamp and hold a tube so that its end surface can be faced or ground more perfectly or reshaped for some particular purpose. A cutting or grinding mechanism may then be attached to and guided by the clamp structure to perform its function with the desired accuracy.

It will thus be seen that the present invention, at least in some of its aspects, is not limited to use or association with welding apparatus although it is particularly suitable for automatic or semiautomatic electric arc welding of large diameter pipelines. For example, the clamping means may hold or support special apparatus for positioning, holding and/or welding brackets, arms, special connectors, etc., onto or near the ends of tubular members, particularly where accurate positioning and precision holding are essential.

In another aspect, the present system is applicable to welding and other systems operating externally or tubular members.

SUMMARY

The invention comprises a clamping mechanism adapted to grip firmly a tube or other hollow cylindrical element, or a pair of end-to-end adjoining elements. This clamp means is supplemented by a centering apparatus and by an end alignment apparatus. The clamp mechanism, comprising radially movable clamping shoes, normally is first moved into approximate clamping position. The centering apparatus is next operated to bring the clamp essentially into true center position with respect to the tube to be held. Then a three-point alignment mechanism is operated to bring the the clamp structure into precision alignment or parallelism with respect to the end plane of the tube member. The clamp is tightened by projecting the clamping shoes into gripping position. Both the centering devices and the alignment mechanism are operated, preferably, by hydraulic or pneumatic pressure. Both equipments are provided with precision mounts, which can be adjusted if necessary, to insure highly accurate positioning.

In order to prevent the clamp mechanism from moving so freely as to overshoot the desired precision position, it may be braked in any suitable manner. Preferably, a propulsion means, attached by an articulated joint, is braked and the articulated joint itself is made stiffly resilient to allow any necessary shift of the clamp into the proper centering and alignment position.

The clamping structure preferably is of dual design so that the first tube can be clamped, after proper centering and alignment, and then a second tube is brought into place, e.g. over flexible guides to prevent major misalignment (the precise alignment means having been withdrawn out of its way) and clamped in the desired position with respect to the first tube member. Then welding can proceed, although the invention is not necessarily limited to welding.

DESCRIPTION OF PREFERRED EMBODIMENT

Figure 1:
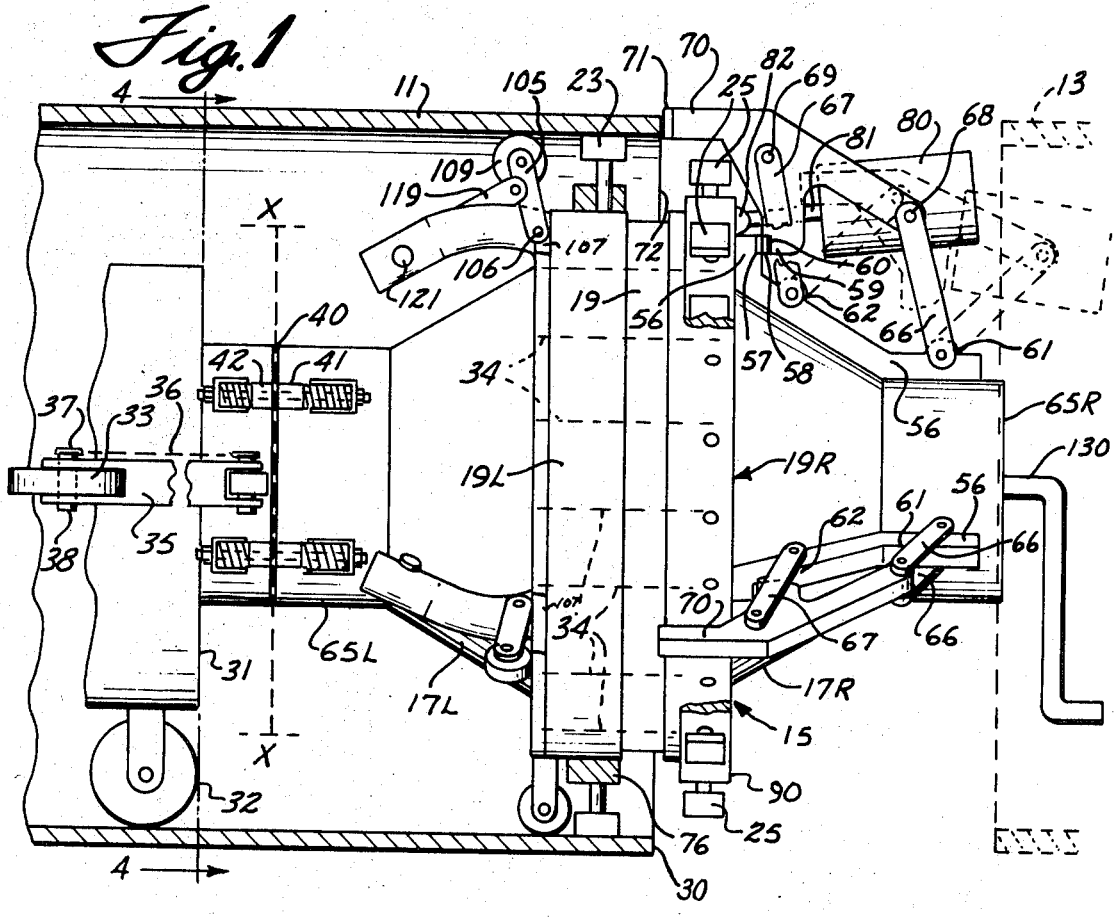
FIG. 1 is a side elevational view of a presently preferred form of the invention, with some parts omitted or broken away and some parts shown in section.

The invention will first be described in connection with a tube joining or pipeline welding system illustrated generally in FIG. 1. In this FIG. a fixed length of pipe 11 is to be connected to a new length 13, shown in dotted lines at the right, as in building a pipeline. The clamping structure which also provides means for guiding a welding unit, not shown herein, comprises a main clamp body 15 to the right of plane x-x, having frustoconical sections 17R and 17L at the right and left, respectively, of a central cylindrical body 21 made up of parts 19R, 19L and a grooved central member 19. These parts are held together by a circle of bolts indicated by dotted lines 34. Grooved member 19 acts as a substructure for supporting the welder means, or other operative means, which may travel orbitally around the clamp mechanism. It also spaces members 19L and 19R apart. Cylindrical members 65R and 65L are attached respectively to the frustoconical members 17R and 17L. Each of these contains actuating means, such as pistons, for moving toggle elements which in turn move groups of clamping shoes 25, 23 into and out of clamping position in a manner well known in the art. These shoes 23, 25 are supported on guide rods or bars slidable in and out of guide rings which are supported by or made integral with the parts 19L and 19R. In the position shown in FIG. 1, the clamping shoes 23 are expanded to grip the fixed length of pipe 11 whereas the other set of shoes 25 is retracted, since the pipe 13, shown in dotted lines at the right, has not yet been brought into place.

One problem in connection with welding large tubes or pipes together is getting the clamping and guiding structure in proper position for holding the parts while forming the weld. The right end surface 30 of pipe section 11, as seen in FIG. 1, ordinarily will have been machined to form a true plane. Any three points on this surface, then, will determine a true plane which is transverse and approximately and in some cases exactly perpendicular to the longitudinal axis of the tubing or pipeline. Where the pipe or tubing is straight, the end surface ordinarily will be perpendicular to its axis; in curved sections the end plane might vary slightly from the perpendicular.

Figure 5:
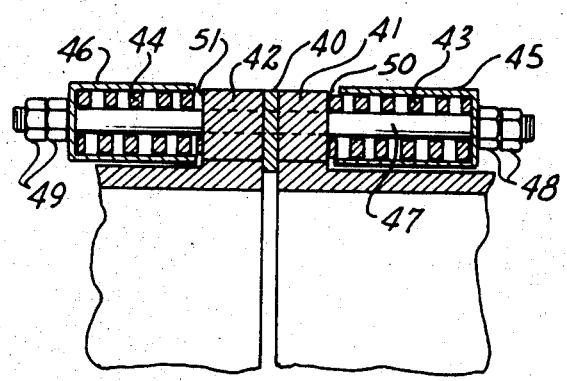
FIG. 5 is an enlarged sectional detail of a limited movement restraining element, taken approximately along 5—5 of FIG. 4.

The clamping structure for a large pipeline is quite a heavy piece of apparatus and desirably is equipped with a propelling or traveling drive mechanism. This is shown diagrammatically in the form of a unit structure 31 to the left of plane x-x, FIG. 1, equipped with a supporting wheel 32. Traction driving wheels 33 mounted in appropriate arms 35 are driven by a suitable motor, not shown, through a chain 36 engaging sprocket 37 mounted on a shaft 38, which is fixed to each of the friction driving wheels 33. The arms 35 can be moved apart, e.g. by toggles or other means not shown, in such a way as to apply a frictional driving engagement between the wheels 33 and the inside surface of the pipe. The motive power may be an electric motor inside the unit 31, not shown; an air driven motor may be used. In either case the drive wheels 33 engage the walls with sufficient force to move the unit along the pipeline, and even uphill when necessary. The drive mechanism also is provided with braking devices, not shown, but conventional in the art, for holding the unit against rolling down hill or for applying a braking or restraining force as the unit approaches clamping position. As best shown in FIG. 5, the unit 31 is connected to the clamping unit 15 by a stiffly resilient limited motion joint which comprises a buffer plate 40 inserted between sets of raised ears 41 formed on the main clamp structure and another set 42 on the tandem driving structure unit.

Figure 4:
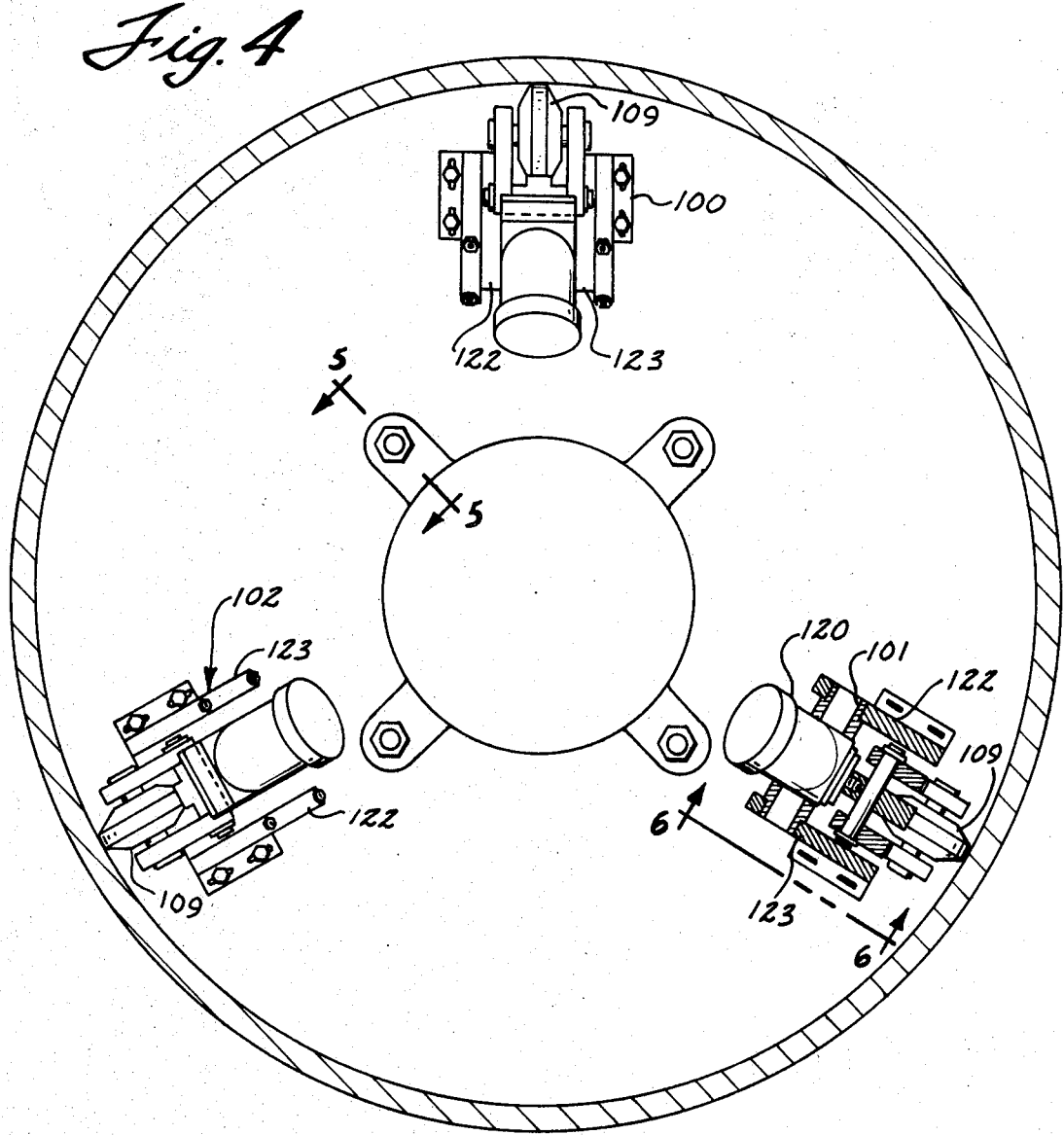
FIG. 4 is a sectional view taken substantially along the line 4—4 and looking to the right of FIG. 1.

Coiled springs of stiff construction, shown at 43 and 44 respectively, are limited in movement by tubular containers 45 and 46, while being held under compression by tension rods 47, one of which passes through each spring as well as through the ears 41, 42. These rods are fitted at either end with nuts 48 and 49, which may be adjusted to place proper tension on the spring. A small gap 50 is provided between cup 45 and the bracket 41, and a similar gap 51 is provided on the other end at each pair of ears. This arrangement provides a limit stop for the stiff resilient flexure which is provided at each pair of ears. Four pairs of such ears are provided, as shown in FIG. 4, although the number may be greater or smaller. This allows for a limited yielding angular adjustment of the clamping unit 15, with respect to the pipe axis and with respect to tandem drive unit 31. This may be necessary, for example, where a length of pipe is curved or has some irregularities in its internal surface.

Figure 3:
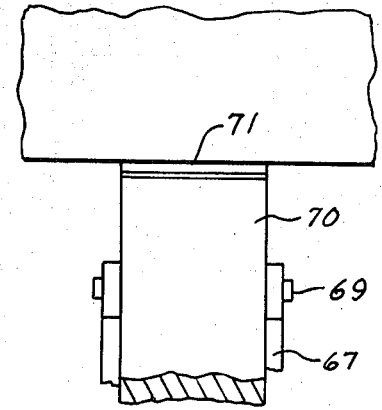
FIG. 3 is a fragmentary top view of the aligning device of FIG. 2.

At the forward end of the clamping structure 15, as seen at the right in FIG. 1, rigid base members 56 are securely attached to the frustoconical member 17R. They may also be attached to the right annular face 15R of the cylindrical middle assembly 15. Preferably, there are three members 56, each provided with a pair of ears 61 and 62. The members 56 may extend onto the outer small cylindrical section 65R. Preferably the members 56 are spaced about 120° apart around the periphery of the clamp structure. Two of these are visible in FIG. 1. To each pair of ears 61 and 62 are secured pairs of pivoted parallel bars 66 and 67; only one bar of each pair is seen in FIG. 1. To the upper or outer ends of these parallel bars are fastened pins 68 and 69 which pass through an aligner device or locater element 70. Each element 70 is provided with a hard steel face plate 71 and has a smooth and accurately finished surface. See FIG. 3. This surface is adapted to contact the end surface 72 of the pipe section 11. Each member 56 has a hardened steel plate 57 adapted to serve as a limit stop for a similar hard plate 58 attached to a shoulder 59 of the aligner or locater 70. The latter plate 58 is held by screws and backed up by shims 60 which can be removed or augmented as needed to secure perfect alignment of the aligners or locaters when they are brought into stop position for gauging the plane of the end surface of pipe 11.

The pairs of the parallel arms 66, 67, provided for each aligner or locater 70, are pivoted with accuracy so that the aligner in each case is firmly mounted. Trunnions 69 are affixed to the hydraulic or pneumatic cylinder 80. Each cylinder 80 has a movable piston inside of it attached to a piston rod 81. The latter is pivotally connected to an ear 82 formed on or attached to the member 56, already described.

The feeler end 71 of each of the movable feeler units 70 moves between pairs of spaced clamping shoes 25 until it is pressed against the end of the pipe. This is accomplished by driving the cylinder 80 to a position where the accurately positioned stop surface on each member 70 engages the accurately formed surface 57 on the appropriate member 56. This precisely determines the position of the clamp body with respect to the end of the pipe and assures that the equipment will be aligned accurately with the plane of the end of pipe 11.

As suggested above, the ring member 19, which is channel shaped in cross section, serves to space apart the clamp housing elements 19L and 19R. It serves also as a guide and support for one or more welding heads which can travel orbitally to form an internal weld between the ends of pipe sections 11 and 13. Space is thus provided for moving a welding device in an orbital path between the rings of clamp shoes 23 and 25. The specific means for welding are not shown herein since they do not constitute a part of the present invention. However, a suitable apparatus for this purpose is disclosed in the above mentioned copending application of Nelson, Ser. No. 608,872.

It will be understood that each of the aligning devices or feelers 70 is operated independently by its own cylinder and piston assembly. These operating means are of sufficient power that they will force the body of the clamping unit into the proper aligned position, even against the braking or restraining effect of the traction wheels 33 and against other forces, such as that of gravity. In case the position of the traction unit in the pipe is such as to require it, the flexible articulated joint at elements 40, 41, 42 will yield enough to permit the necessary alignment. In other words, the force exerted by the piston cylinder units 80, 81, etc., is sufficient to overcome the stiff springs 43, 44 if necessary, so as to obtain true and precise alignment of the clamp structure with respect to the end plane of the pipe. This is highly important, particularly in welding large diameter pipes, since a slight angular deviation may cause a failure of welding. The projecting electrode, usually a thin wire, and the welding arc, will not be directed properly to the juncture between the pipe ends that are to be welded together.

Aside from the problem of securing proper parallel alignment with the end plane, it is important that the clamp structure be positioned centrally within the pipes to be joined. The weight of the clamp tends normally to hold it somewhat below the center of the pipe.

Figure 6:
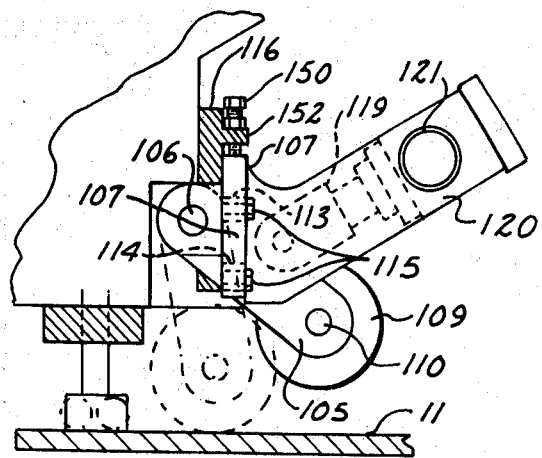
FIG. 6 is an enlarged detail view of one of the centering elements.

Referring next to FIG. 4, there are shown three clamp centering devices 100, 101 and 102, positioned at angles 120° apart around the pipe attached to the frame of the clamp structure. One of these devices is shown in FIG. 1 as comprising an arm 105 pivotally mounted at 106 on an adjustable bracket 107 secured firmly but adjustably to the clamp frame. The arm supports at its outer end a rotatable wheel 109, journaled on a pin or axle 110. These parts are shown in larger scale in FIG. 6. The adjustable bracket 107 is slotted at 113, 114 to receive bolts 115 which secure it to a rigid member 116, the latter being secured to or forming a part of the base structure of the clamp. To make an adjustment, the bolts 115 are loosened and a bolt 150 threaded through a rigid part 116, which is secured to or integral with the frame, is turned to adjust plate 107 as desired. Thereafter, bolts 115 are tightened. The arm 105 is mounted so that it can be swung in an arc about its pivot pin 106. This is operated by a piston rod 119 driven by fluid pressure in a cylinder 120. The latter is provided with a pair of trunnions 121 which are pivotally mounted in a pair of side plates 122, 123 secured to bracket 107. See FIG. 4. This provides for a rocking movement of the cylinder as the piston is extended or retracted to swing the arm 105 about its pivot 106 from the position in full lines, FIG. 6, to the dotted line position in said FIG. It will be understood that each of the three centering units, 100, 101, and 102, FIG. 4, is operated by its own piston and cylinder assembly. The bracket 107 is adjusted with respect to the rigid member 116 in each case so that when the rollers 109 are forced against the inside of the pipe 11, the clamp structure is centered with respect thereto. If desired, the wheels 109 can be replaced by shoes, analogous to brake shoes, to help hold the apparatus in the place.

A typical operation of the structure just described is as follows: The apparatus is moved through the pipe 11 to its forward end 30, or almost to that position, and brakes are applied so as to lock the propulsion wheels 33 with reasonable firmness. If the clamp is of the type which can be pulled manually by a tongue or reach rod 130, FIG. 1, some sort of brake nevertheless should be applied to prevent too free a motion of the clamp structure within the pipe. The simple reach rod, which also serves as a conduit for utilities, i.e. for welding current, shielding gas, etc., may be equipped with sensing devices to actuate the centering and/or aligning devices when the rod emerges to a predetermined point out of pipe length 13, as will be understood by those skilled in the art. Thereupon the centering wheels 109 are brought into centering position, applying fluid pressure to their operating pistons to bring each of them into the dotted line position of FIG. 6. These wheels then center the clamp structure quite accurately within the pipe. Also, if the pipe is somewhat out of round, due to any cause, the clamp, centered by devices 109, etc., will tend to bring it back to true round formation.

Next the aligners or contact members 70 are brought from their normal rest positions radially inside the pipe in a single continuing swinging motion into alignment position with their finished surfaces 71 against the end elements 30 of the pipe, as shown in FIG. 1. This is done by applying pressure within each cylinder 80 to draw the cylinder itself towards the pipe 11, since the piston rod is anchored to the frame of the apparatus at 82. The feeler or aligner 70 is pushed forward as far as possible, bringing its accurately finished surface 58 against the accurate stop surface 57. To the extent necessary, this operation exerts enough force to pull the clamp further out of pipe 11, even though the mechanism has brakes on. Since the apparatus has brakes applied to it, and also because the centering wheels may provide some drag, the clamp will not overrun the desired alignment position. Of course, if it should overrun such position before braking, the aligner or locater elements can be withdrawn, by retracting the cylinders to the dotted line position of FIG. 1. Then the clamp should then be pushed or driven back into the pipe 11 for a new alignment operation. When there is sufficient driving force available, an alternative procedure is to move the aligners to alignment position and then drive the apparatus to the left, FIG. 1, until proper alignment is obtained.

Figure 2:
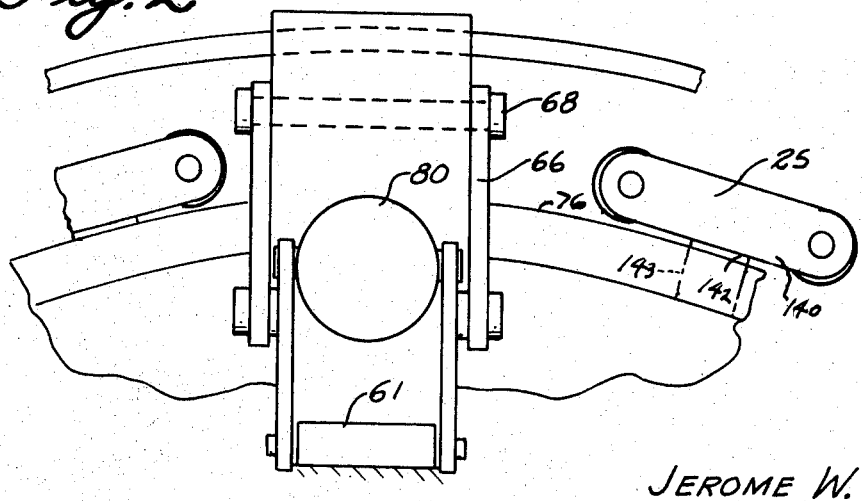
FIG. 2 is an enlarged end view showing one of the aligning devices and associated parts, as seen from the upper right of FIG. 1.

The mounting of the parallel bars 66 and 67, and their relationship with respect to the operating cylinder 80, are shown further in FIG. 2. Here are shown also a ring 76 through which are guided projecting bars or rods clamp elements 25. In the form shown these clamp elements or shoes consist of rigid bars 140 mounted on slidable rods 142 which are fitted in free sliding relationship within openings 143 in the ring 76 and other parts of the clamp structure.

After the clamp is aligned, the inner or left ring of clamp shoes 23, FIG. 1, are firmly pressed into clamping relationship with respect to the pipe 11. They hold it tightly enough that the clamp cannot shift within the pipe. Thereafter, each of the centering devices can be retracted to the full line position of FIG. 6. The alignment devices are withdrawn also to the dotted line position of FIG. 1. In this position the alignment feelers 70 are drawn out of the way. This permits the new section pipe 13 to move freely over them into abutting relationship with the end surface 30 of pipe 11. Thereupon the clamping shoes 25 are expanded to hold the new section 13 firmly in place for the welding operation.

The mounting of the aligners of feeler elements 70 on the parallel bars is preferably arranged in such a way that these bars swing through an arc from the full retracted position, shown in dotted lines, FIG. 1, to the alignment position shown in full lines in said FIG. In this way they swing up and over to clear elements within the space between the clamping shoes 23, 25 and between the guide rings 76 and 90. This space, as noted before, is provided for the orbiting welding mechanism.

It will be understood that instead of using a welding mechanism in this apparatus, in some cases other devices may be used. Thus, a grinding tool which travels around the main body member 15 of the clamp and in front of the ring 76 may be used to form a new surface, a rebate, or some other configuration on the end of the pipe, if desired. Other operations can be performed in similar fashion, as will be obvious to those skilled in the art.

Figure 7:
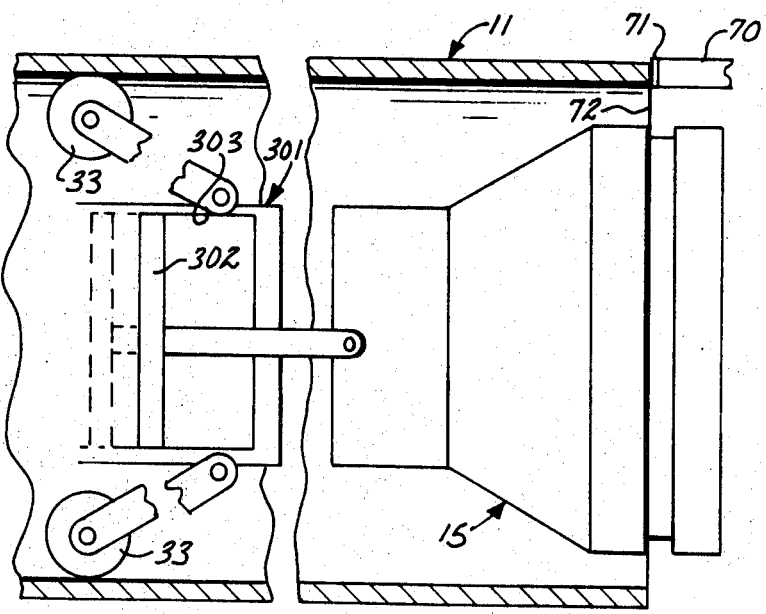
FIG. 7 shows an alternative system for pulling the clamp and welder mechanism into alignment.

FIG. 7 shows an alternative arrangement wherein the drive trailer 301 is connected to the clamp structure through a fluid piston-cylinder assembly 302, 303, by means of which the spacing between the trailer and the clamp structure 15 can be changed. With the aligner contactor surfaces 71, (FIG. 1) brought into abutment with the end surface 72 of pipe 11, and with the propelling wheels 33 firmly braked, the fluid operated piston 302 is moved to pull the clamp towards the trailer. Sufficient force is applied to overcome the weight of the clamp and any other forces, including friction of the centering devices 109, FIG. 1, etc., so as to bring the clamp structure into both precise center position and precise alignment with the plane of end surface 72.

It will be understood that by careful design the clamping shoes 23 and/or 25, and their operating mechanisms, may be so arranged that they perform to some extent the centering operation. As a rule, however, because of necessary manufacturing tolerances and inherent flexibilities of some parts, the clamping shoes do not operate with sufficient precision to obtain the desired accuracy of centering. It is therefore deemed better to employ the centering devices 100, 101, and 102 as previously described by proper adjustment. These can be adjusted with a high degree of accuracy, using the screw 150, FIG. 6, as a positive limiting stop. The wheels 109, which preferably are made of hard metal, such as steel, and are not yielding, may be made to give the precise centering desired or may be placed with shoes as noted above.

It will be understood that more than three of the alignment devices or feelers 70 may be used if desired. Likewise, more than three of the centering devices 100, 101, etc. may be used. In general, though, 3-point locating systems have been found to be entirely satisfactory and they are relatively simple. Other types of locating devices may be used, but those described have the advantage of high accuracy. They are capable of applying heavy pressures, sufficient when used with the clamp to round out a pipe that is deformed from the normal circular shape. This is accomplished primarily by bringing the heavy clamping mechanism into proper centering and alignment position in spite of the force of gravity or other forces which tend to oppose such centering and alignment.

It will be understood that other types of locating shoes, feelers, centering devices, etc. may be employed. Those described are only exemplary. It is obviously desirable, however, that the locating and aligning parts or mechanisms be positive in operation and that they have positive limit stops so that the final positioning of the clamp and the units which is supports, such as welding apparatus, etc., will be precise and accurate enough to obtain the desired results.

The parallel bar arrangement of FIG. 1, by which the aligner or feeler elements 70 are swung into and out of position, is particularly meritorious because of the positive stop and gauging features which it permits. It is advantageous further because these devices first swing up and then outwardly and downwardly to clear the apparatus associated with the clamp as well as to clear the oncoming pipe 13. These devices can be retracted very rapidly and completely so as not to interfere in any way with the positioning of the new length of pipe.

It will be understood that various modifications, including and in addition to those mentioned above, may be made without departing from the spirit and purpose of the invention. It is intended by the claims which follow to cover such modifications as would occur to those skilled in the art, as fully and as broadly as the state of the prior art properly permits.

We claim:

1. In apparatus of the character described, wherein an internal expandable clamp to be used inside a hollow workpiece having an internal cylindrical surface is to be held in a work position and accurately located with respect to a transverse plane defined by an end surface element of said workpiece, the combination which comprises a rigid clamp frame movable axially along inside said workpiece, a set of clamp shoes mounted in fixed position axially of said frame for radial expansion to engage firmly with said internal cylindrical surface and close to said end surface element, means associated with said frame for applying a restraining force to inhibit undesired axial movement of said frame within said workpiece, and a plurality of devices for axially aligning and positioning said frame, each of said devices comprising a power-operated gauge and locator element pivotally mounted on said frame and normally occupying a rest position radially inside said internal cylindrical surface but movable in a single continuing motion from said rest position to project radially outside said internal surface and engage said end surface element and overcome said restraining force to pull the clamp frame to said accurately located work position.

2. Combination according to claim 1 which includes means for centering the clamping structure with respect to said internal cylindrical surface.

3. Combination according to claim 1 in which the plurality of devices for axially aligning and positioning said frame include three movable aligner elements for the end surface element, each of said aligner elements being pivoted on parallel arms, and separate motive means for forcibly moving each of said aligner elements into contact with said end surface element.

4. Combination according to claim 1 in which the plurality of devices for axially aligning and positioning said frame include three movable aligner elements for the end surface element and wherein the precision alignment devices include a stop position surface on each aligner device adopted to engage a stop element accurately fixed with respect to the clamp structure.

5. Combination according to claim 1 which comprises means for gripping a second hollow workpiece having an internal cylindrical surface and holding it in predetermined position with respect to the first hollow workpiece.

6. Combination according to claim 1 which comprises a stiffly resilient articulated joint connecting another unit structure to the clamp structure.

7. Combination according to claim 1 and adapted to hold two hollow cylindrical members together end to end with precision in position for forming a weld between the adjacent ends, which includes two independent sets of expandable gripping elements for separately engaging said respective members, said sets being spaced to permit orbital passage of a welding mechanism between them and inside of said members, means for centering the clamping structure with respect to both said cylindrical elements, means for operating said centering means, and stiffly yielding means for accommodating any necessary shifting of said clamping structure with respect to an attached unit structure, so as to accomplish both accurate centering and precision alignment with respect to said plane.

8. Combination according to claim 7 which comprises fluid cylinder and piston means for operating each of said plurality of devices for axially aligning and positioning said frame and said centering means.

9. Combination according to claim 1 which comprises a drive trailer attached to said clamping frame and means for changing the relative positions of said clamping frame and said trailer to positively move the clamp frame into aligned position as determined by said plurality of devices for axially aligning and positioning said frame.

10. A system of the character described which comprises, in combination, an internal clamp structure having gripping elements and means for moving them into and out of gripping position to grip and release a hollow cylindrical member having a longitudinal axis and a planar end element, at least three centering devices movable mounted on said structure, means for projecting said centering devices into contact with said cylindrical member with sufficient force to move the clamping structure into a position centered substantially on said axis, and separate means projectable in a single continuing operating motion from a rest position radially within the hollow cylindrical member to a radially outward position engaging said end element and to pull the clamp structure firmly and accurately into a predetermined working position parallel to said planar end element.

11. Combination according to claim 10 in which the centering devices are pivotally attached to said clamping structure and wherein fluid motive means are provided to operate said centering devices.

12. Combination according to claim 10 wherein there are also provided separate aligner means for accurately adjusting the orientation of the clamping structure with respect to a plane transverse to said axis.

13. Combination according to claim 10 which comprises a stiffly resilient articulated joint connecting a drive and braking unit to said clamping structure.

14. The method of holding and aligning a work-positioning structure in an accurately predetermined position inside a tubular workpiece and in a plane accurately parallel to a planar end element of surface of said workpiece, which comprises the following steps in combination:
   a. moving the structure axially along the inside the workpiece to a position approaching but short of said predetermined position;
   b. applying to said structure a restraining force tending to prevent further axial movement;
   c. projecting from said structure at least three circumferentially spaced gauge elements in a single continuing motion imparted to each to engage each gauge element with a point on said end element; and thereby
   d. applying sufficient reactive force between each of said elements and the structure to overcome the restraining force and thereby move said structure into the predetermined position.

15. Method according to claim 14 wherein said structure is centered with respect to the cylindrical surface of said tubular workpiece prior to clamping.

16. Method according to claim 14 wherein two hollow tubular cylindrical members are held in abutment and in precision position for welding and wherein a welder device is guided and moved relatively around said work-positioning structure between clamping elements engaging both cylindrical members for forming a weld internally between the abutting ends of said members to weld said members together.